No. 845,810.  
PATENTED MAR. 5, 1907.  
T. F. NAYLOR & O. S. HALL.  
LOOM FOR WEAVING CHENILLE OR PILE FABRICS.  
APPLICATION FILED JUNE 26, 1905.

7 SHEETS—SHEET 1.

Witnesses  
N. M. Kuehnl  
John G. Percival

Inventors:  
Thomas F. Naylor  
Oscar S. Hall  
By Richardson  
Attorneys

THE NORRIS PETERS CO., WASHINGTON, D. C.

No. 845,810. PATENTED MAR. 5, 1907.
T. F. NAYLOR & O. S. HALL.
LOOM FOR WEAVING CHENILLE OR PILE FABRICS.
APPLICATION FILED JUNE 26, 1905.
7 SHEETS—SHEET 2.
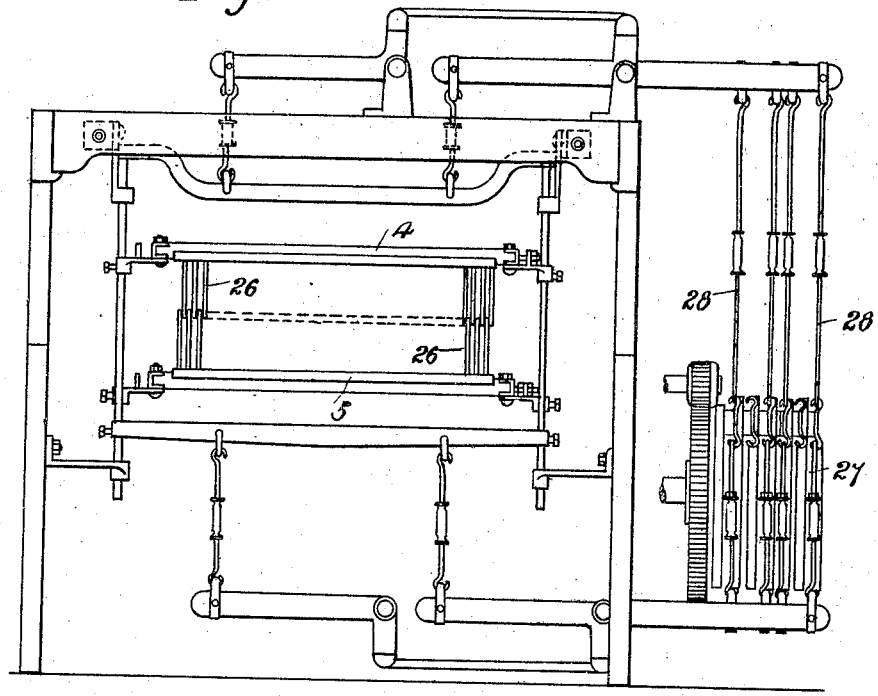
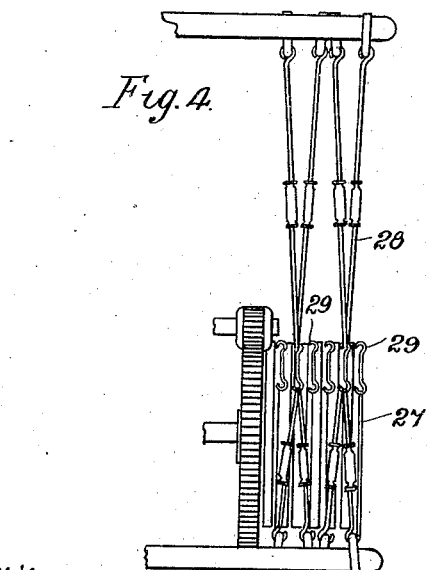
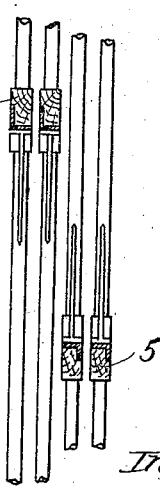
Inventors:
Thomas F. Naylor
Oscar S. Hall
Witnesses No. 845,810.

PATENTED MAR. 5, 1907.

T. F. NAYLOR & O. S. HALL.
LOOM FOR WEAVING CHENILLE OR PILE FABRICS.
APPLICATION FILED JUNE 26, 1905.

7 SHEETS—SHEET 3.

Witnesses
H. M. Kuehne
John A. Percival

Inventors
Thomas F. Naylor
Oscar S. Hall
By Richardson
ATTORNEYS

THE NORRIS PETERS CO., WASHINGTON, D. C.

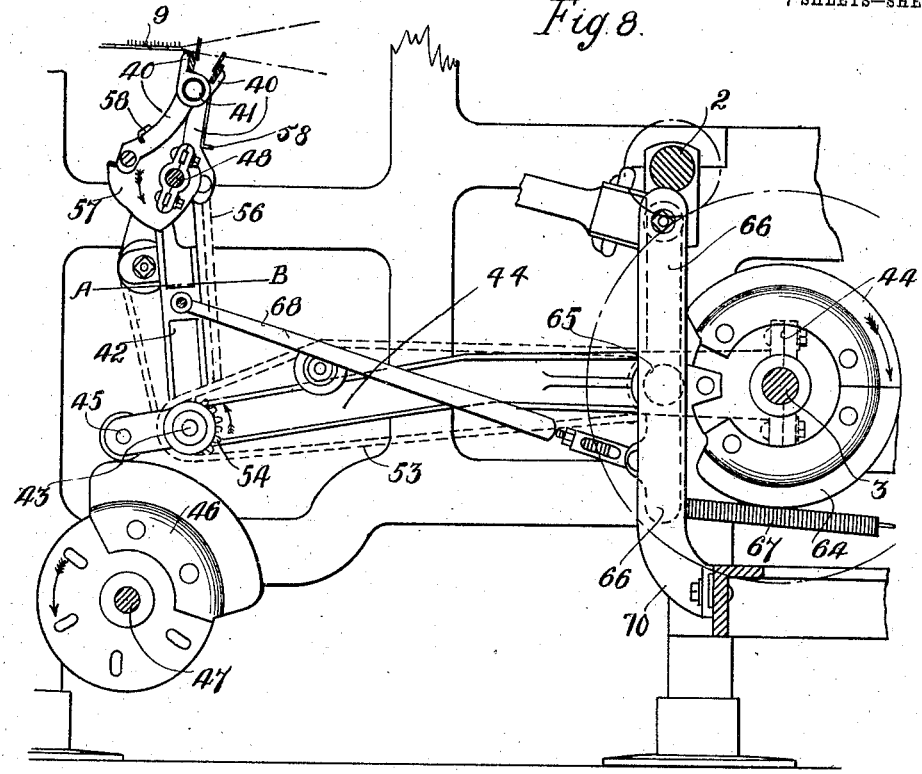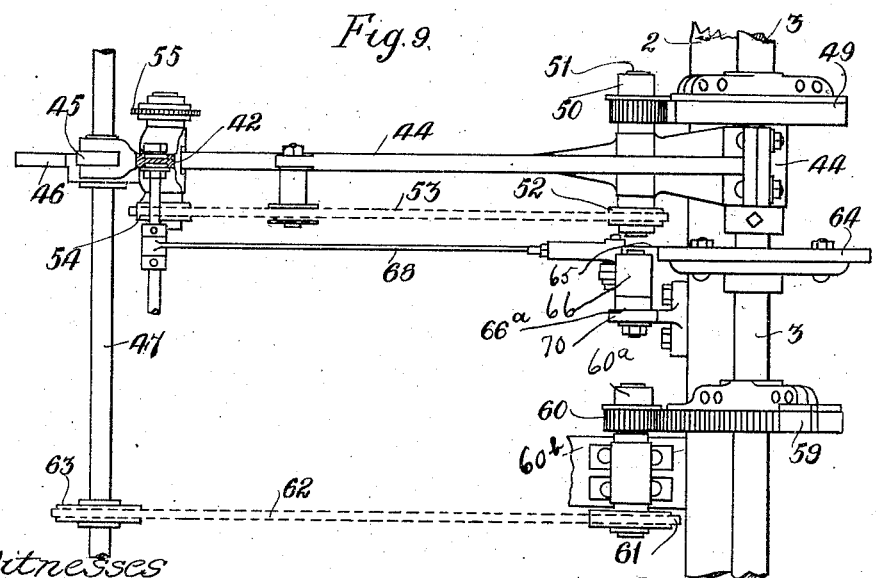

No. 845,810. PATENTED MAR. 5, 1907.
T. F. NAYLOR & O. S. HALL.
LOOM FOR WEAVING CHENILLE OR PILE FABRICS.
APPLICATION FILED JUNE 26, 1905.

7 SHEETS—SHEET 5.

Witnesses
N. M. Kuehne
John A. Percival

Inventors:
Thomas F. Naylor
Oscar S. Hall
By Richardson
ATTORNEYS

No. 845,810. PATENTED MAR. 5, 1907.
T. F. NAYLOR & O. S. HALL.
LOOM FOR WEAVING CHENILLE OR PILE FABRICS.
APPLICATION FILED JUNE 26, 1905.

7 SHEETS—SHEET 6.

Witnesses
Inventors
Thomas F. Naylor
Oscar S. Hall

ATTORNEYS.

No. 845,810. PATENTED MAR. 5, 1907.
T. F. NAYLOR & O. S. HALL.
LOOM FOR WEAVING CHENILLE OR PILE FABRICS.
APPLICATION FILED JUNE 26, 1905.

7 SHEETS—SHEET 7.

Attest:
Ewd. L. Tolson
B. J. Phillips

Inventors
Thomas F. Naylor
Oscar S. Hall
By Richard N. C. Atty's

UNITED STATES PATENT OFFICE.

THOMAS FOX NAYLOR, OF KIDDERMINSTER, AND OSCAR STANDRING HALL, OF BURY, ENGLAND.

LOOM FOR WEAVING CHENILLE OR PILE FABRICS.

No. 845,810.      Specification of Letters Patent.      Patented March 5, 1907.

Application filed June 26, 1905. Serial No. 267,082.

*To all whom it may concern:*

Be it known that we, THOMAS FOX NAYLOR and OSCAR STANDRING HALL, subjects of the King of Great Britain and Ireland, residing at 4 Green street, Kidderminster, and Park Cottage, Bury, England, respectively, have invented new and useful Improvements in Looms for Weaving Chenille or Pile Fabrics, of which the following is a specification.

Our invention relates to improvements in looms for weaving chenille or fur pile fabrics, and has for its chief object to produce carpets to resemble hand-tied or knotted Turkey or oriental carpets.

Our improvements may also be applied for setting ordinary or fan-shaped chenille in ordinary chenille carpets.

A further improvement relates to means for weaving an inch or two of plain fabric (drop-lea)—that is to say, the ground fabric—without the chenille or filling-weft, this ground fabric being subsequently turned over and sewed to the under side of the carpet to prevent it unraveling (which term "drop-lea" is well understood in the trade) at the beginning and finish of each carpet.

Figure 1:
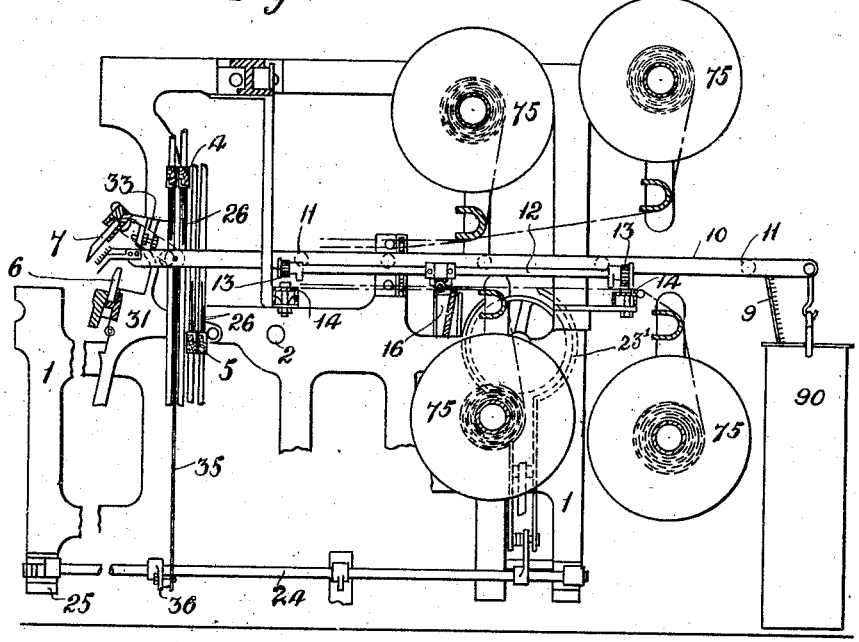
Figure 2:
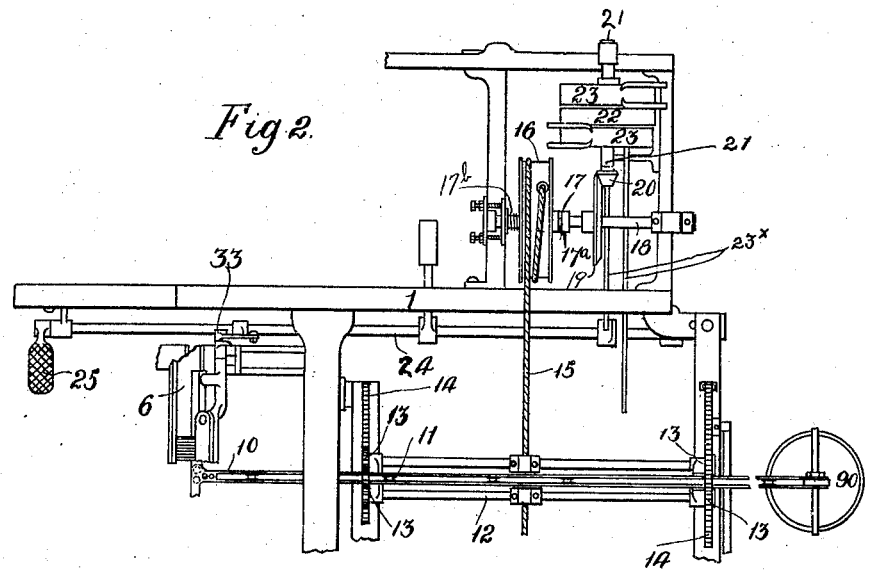
Figure 6:
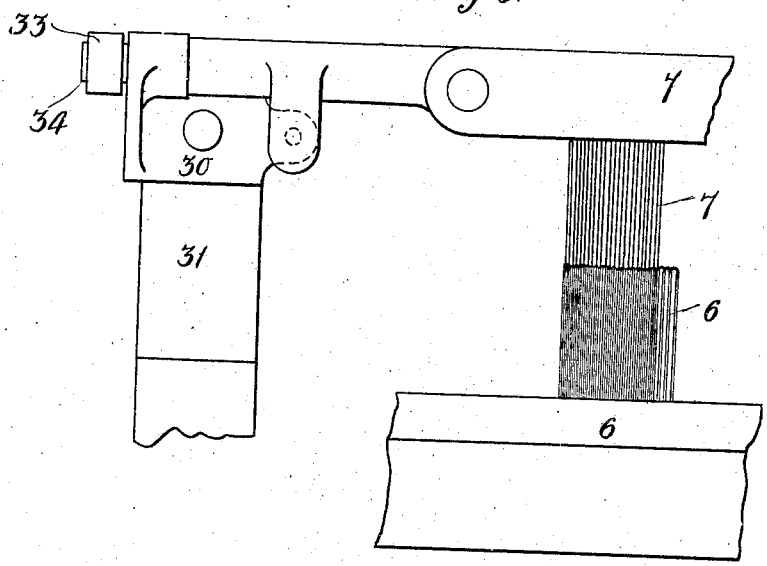
Figure 7:
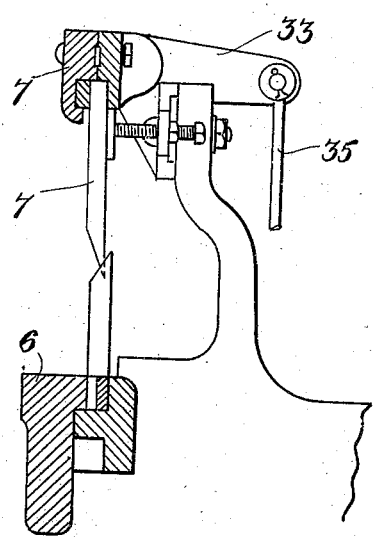
Figure 10:
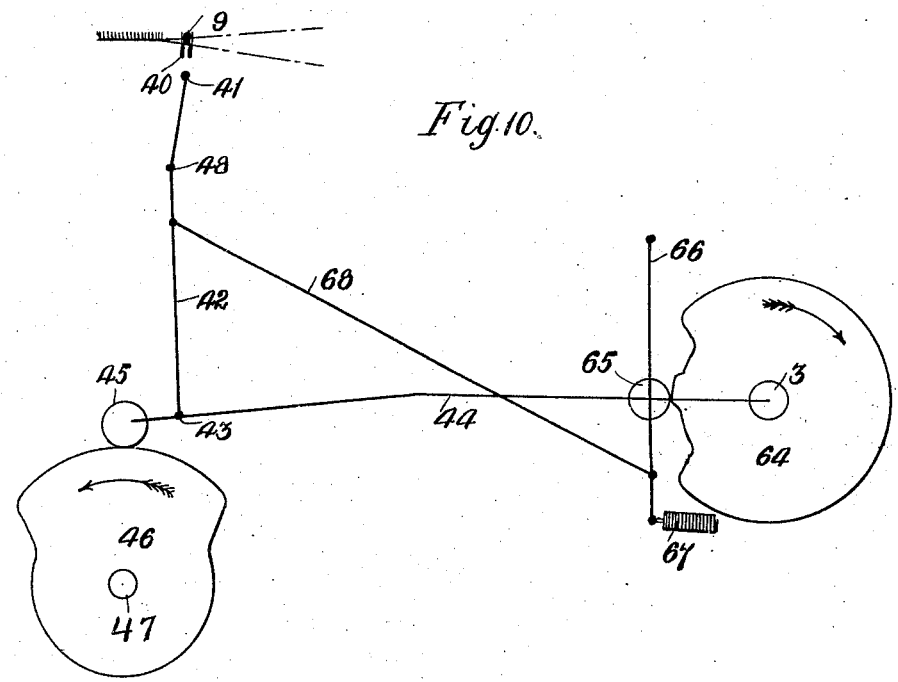
Figure 11:
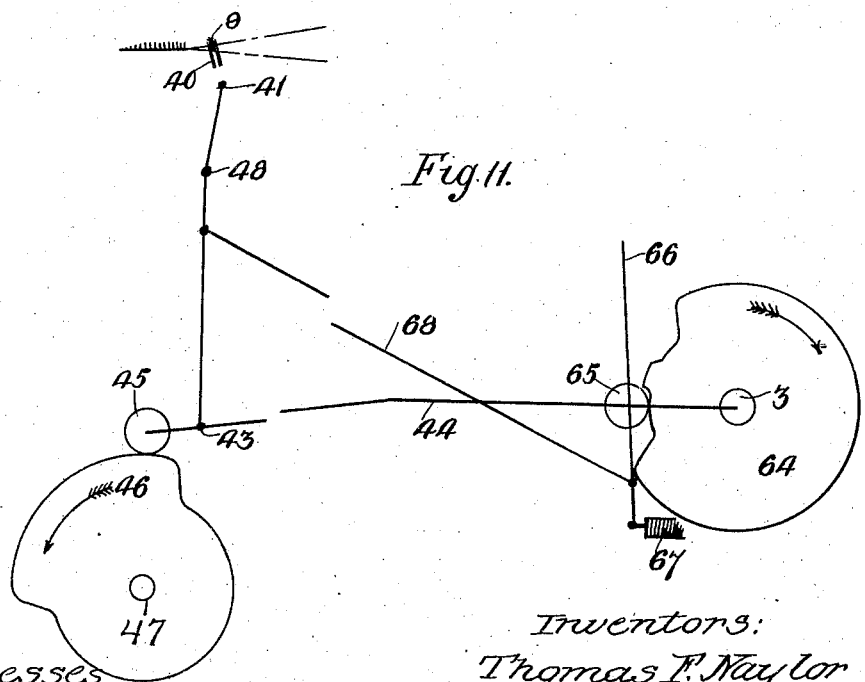
Figure 13:
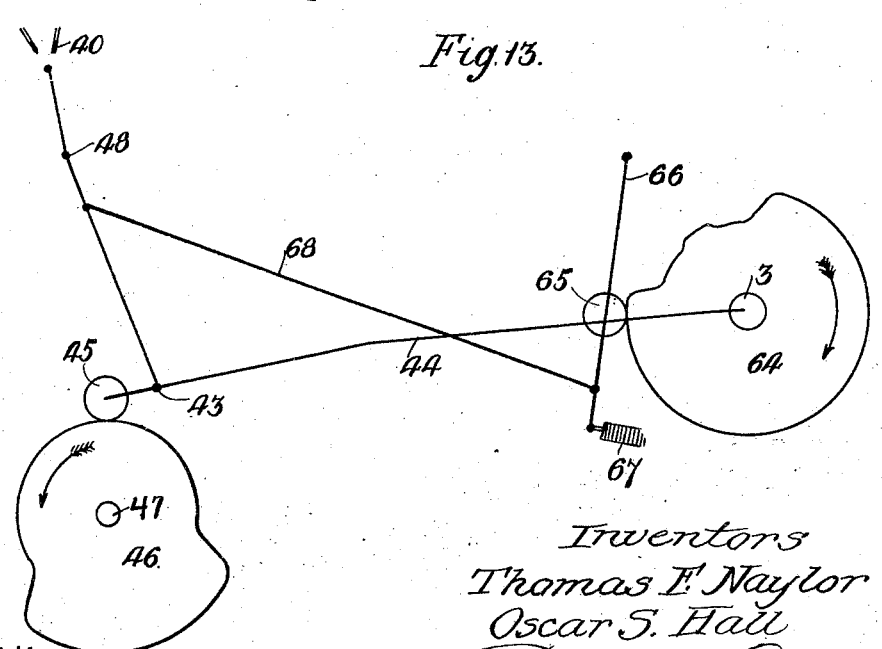
Figure 14:
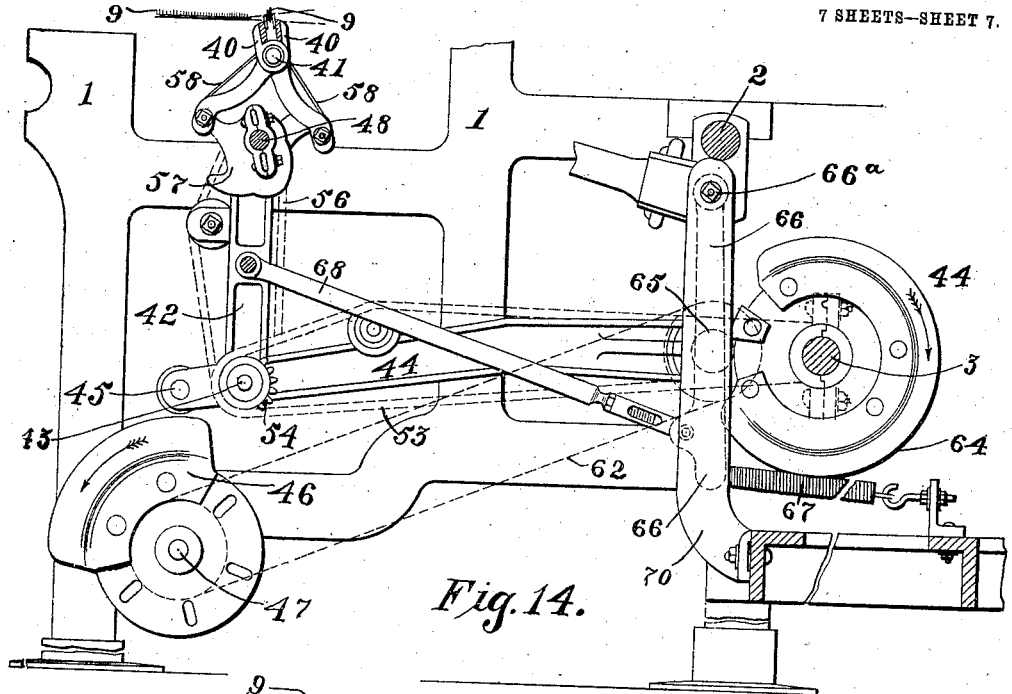
Figure 15:
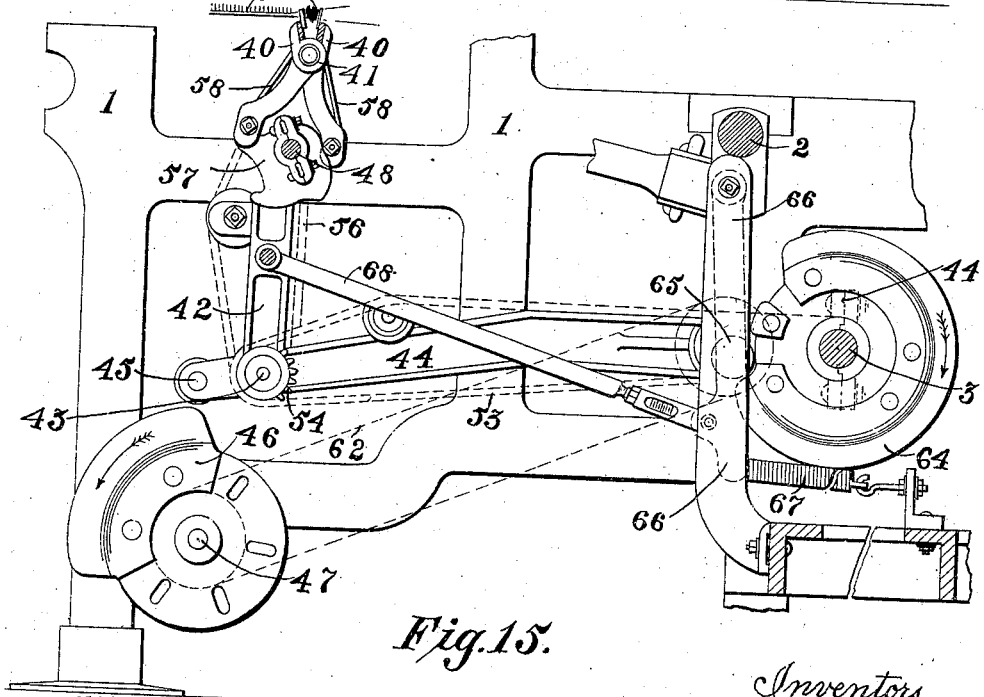

In the accompanying six sheets of drawings, Figure 1 is a sectional side elevation of a loom made according to our invention for weaving chenille pile fabrics. Fig. 2 is a plan of part of Fig. 1. Fig. 3 is a front elevation of the loom, showing the arrangement of the healds and tappets. Figs. 4, 5, 6, and 7 are detail views of parts of Figs. 1, 2, and 3. Figs. 8 and 9 are side elevation and plan, respectively, of parts of the loom to illustrate the chenille-setting mechanism, Fig. 9 showing part of Fig. 8 on the line A B in section; and Figs. 10, 11, 12, and 13 are diagrammatic views to show the chenille-setting jaws and other parts in different positions. Figs. 14 and 15 are side elevations showing the parts in different positions.

In the drawings, 1 denotes the frame of the loom; 2, the crank-shaft; 3, the tappet-shaft; 4 and 5, the healds of special construction, as hereinafter described; 6, the lower and 7 the upper pivoted portion of the reed; 90, a can in which the chenille 9 is carried; 10, the chenille-carrier, which extends from front to back of the loom and from which the can 90 is suspended, and 11 a series of small grooved pulleys to support the chenille.

The carrier 10 is mounted upon a frame 12 with a pinion or pinions 13 at each end, which gear into two racks 14 upon the loom-frame. The frame 12 is fastened to a rope 15, which is secured at one end to and wound round a drum 16 and passes over a guide-pulley at the other side of the loom and back to the drum 16, to which it is again secured. The drum 16 is connected by a spring-clutch 17 to a shaft 18. The spring-clutch is composed of a fast collar $17^a$ with ratchet-teeth and corresponding teeth on the adjoining face of the boss of the drum 16, a spiral spring $17^b$ holding the parts in gear, but free to slip in case the frame 12 has completed its traverse before its driving-belt has been changed from the fast to the loose pulley. Upon the shaft 18 is secured a bevel-wheel 19 in gear with a pinion 20, fast upon a short driving-shaft 21. On this driving-shaft 21 is mounted a single fast pulley 22 and a pair of loose pulleys 23, one on each side of it, for open and crossed belts, respectively. The strap-forks 23' for these belts are each connected by bars $23^\times$ to a separate shaft 24, one shaft being at each side of the loom and a treadle 25 being secured to each of these shafts.

The heald-shafts are composed of top and bottom staves 4 and 5, one half of the needles 26 being secured to the top staves and the other half to the bottom staves. The top staves are lifted two heights by the tappets 27, one height during the picking of the binding-shuttle and the higher lift to allow the chenille-carriage to pass across the loom; but this motion requires no special description. Fig. 3 shows the four coupling-rods 28 coupled to the four weaving-tappets 27, and Fig. 4 shows the same rods 28 after they have been uncoupled and recoupled to two additional tappets 29.

The upper portion 7 of the reed is pivoted upon a bracket 30, secured to the lathe 31. To open the reed, an arm 33 is secured to the projecting end 34 of the reed-top, and to this arm is pivoted a vertical rod 35, connected below to a lever 36, secured to the shaft 24, all these parts being duplicated at the other side of the loom.

In Figs. 8 and 9 the chenille-setter is shown, consisting of a pair of jaws 40 with pins or teeth corresponding in number with the dents in the reed and pivoted upon a shaft 41. The jaws 40 and parts appertaining thereto are carried by two uprights 42, each mounted upon a short shaft 43, which is carried in a pair of horizontal arms 44, pivoted upon the tappet-shaft. These arms at their other ends carry rollers 45, which run upon tappets 46, secured upon a shaft 47, and thus raise and lower the uprights 42 as required. A shaft 48, mounted in the upper parts of the uprights 42, is driven from segmental toothed wheels 49, secured upon the tappet-shaft 3 and gearing into pinions 50, secured upon short shafts 51, mounted in the arms 44. The wheel 49 being a wheel with teeth on part of its circumference only, no teeth are visible in the position in which the wheel stands in Fig. 9. A chain-wheel 52 upon each shaft 51 drives, by a chain 53, a wheel 54 upon the shaft 43, and a second chain-wheel 55 drives, by a chain 56, a wheel (not shown) secured upon the shaft 48. Tappets 57, fast upon the shaft 48, open the jaws 40 against the resistance of springs 58. On the tappet-shaft 3 is secured another segmental toothed wheel 59, which gears into and drives a pinion 60, fast upon a short shaft $60^a$, mounted in a stationary bracket $60^b$. At the other end of this shaft is secured a chain-wheel 61 for a chain 62, which passes over a chain-wheel 63, fast upon the shaft 47, and gives motion to it. A pair of cams 64 are also secured upon the tappet-shaft 3, one on each side of the loom, and each of these cams acts upon a roller 65, carried upon an arm 66, pivoted at $66^a$ to stationary brackets 70. Each roller 65 is drawn against the cam by a spring 67. To each arm 66 is pivoted one end of an inclined rod 68, pivoted at the other end to one of the uprights 42, and consequently these uprights receive an intermittent rocking motion from the cams 64.

A driving-strap upon the ordinary fast and loose pulleys (not shown) is controlled by a spring starting-handle, as usual, and operates suitable mechanism for picking the shuttle across the loom.

In the drawings four warp-beams 75 are shown; but two or other convenient number may be employed, half of the warp-threads being drawn through the upper and the other half through the lower needles 26 of the heald-shafts.

The operation of the loom is as follows: A few inches of plain fabric or drop-lea is first woven by coupling the four rods 28 to the two additional tappets 29, as shown in Fig. 4, a comparatively fine weft being employed, and the reed being closed the loom is stopped with the crank on the bottom center. Before commencing to weave the chenille carpet he coupling-rods 28 are hooked upon the four tappets 27 (see Fig. 3) and the shuttle changed for one containing a coarser weft, the chenille-setters being left in the position shown in Fig. 8. One operative then depresses one of the treadles 25, which turns one of the shafts 24, and this movement is conveyed by the lever 36, rod 35, arm 33 to the upper portion 7 of the reed, and thereby turns its dents away from the dents 6 of the lower half of the reed, as shown in Fig. 1. The same movement of the shaft 24 actuates one of the strap-forks to move its driving-strap from its loose pulley 23 to the fast pulley 22, which by the gears 19 and 20 sets the drums 16 into motion in the required direction to draw by the rope 15 the frame 12 with the chenille-carrier 10 guided by the pinions 13 in gear with the racks 14 across from one side to the other of the loom. The can 90 being suspended from the traveling carrier, the chenille 9 is drawn up out of the can and laid in the shed and in the jaws 40 of the chenille-setter, which will then be in the position shown in Fig. 8. When the treadle 25 is released, the reed closes with the chenille-carrier 10 at rest at the other side of the loom. The operative now adjusts and matches the chenille to the pattern or design, and when this has been done the loom is started by the ordinary setting-on handle, which moves the main driving-strap onto the ordinary fast pulley, while three or other convenient number of picks of binding-weft are put in, and the loom is then stopped automatically or by hand, as desired, with the crank on the bottom center, the top healds 4 at the end of each three picks of binding-weft being left in their second or highest position to allow the passage of the chenille-carrier 10 across the loom, the chenille or pile setter 40 being also raised and with its jaws open, as shown in Fig. 8.

After the loom has put in the picks of weft and the chenille been matched by the weaver the chenille-setter is actuated in the following manner: The setter is kept raised by the roller 45 remaining on the raised portion of the tappet 46, and the shaft 48, driven from the tappet-shaft 3 by the chains 53 and 56, is turned so that the tappets 57, secured upon and moving in the direction of the arrow, turn the jaws into the position shown in Fig. 10, so as to set the chenille into a vertical position or thereabout in the shed. By a further movement of the parts the cam 64 has allowed the roller 65 to come onto its smallest diameter, and this movement combined with that of the tappets 57 moves the jaws 40 into the position shown in Figs. 11 and 14, which sets the chenille in the proper position in the shed.

Figure 12:
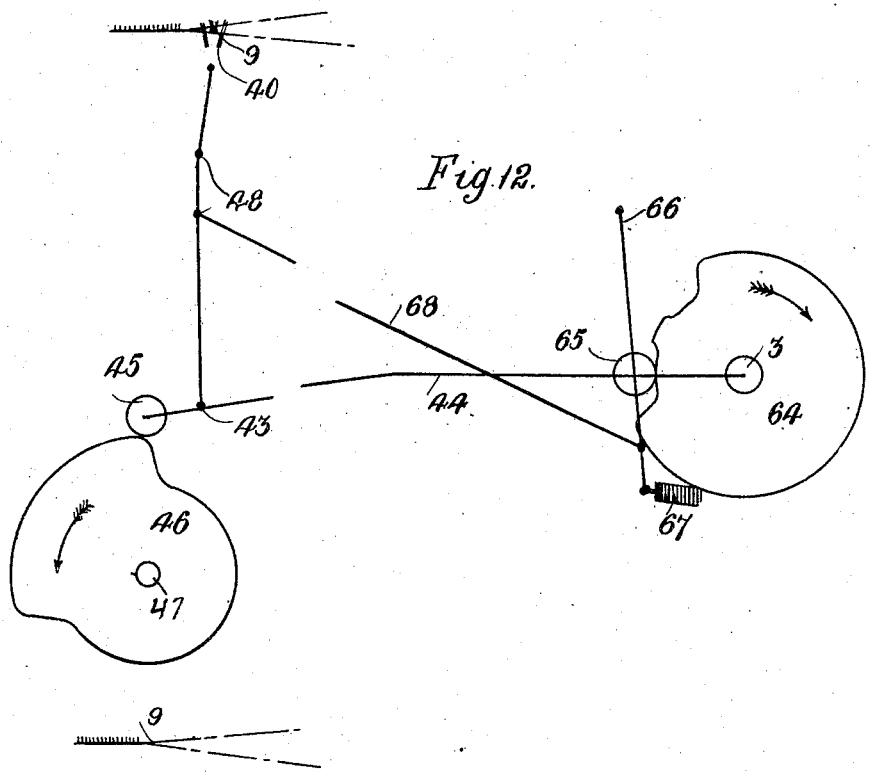

Figs. 12 and 15 show the jaws open, this having been effected by the movement of the tappets 57, while in Fig. 13 the jaws are drawn down below the shed, the roller 65 being upon the large diameter of the cams 64 and the rollers 45 on the small diameter of the tappets 46, and by the time the picks of weft have been put in the jaws 40 will have resumed the position shown in Fig. 8, when the loom is stopped and the operation of putting in the chenille is repeated. The operative then depresses the other treadle 25 on the opposite side of the loom, which moves the other strap-shifter and puts the other strap onto the fast pulley 22, thus reversing the direction of the drum 16 and drawing the chenille-carrier back again across the loom to the other side.

What we claim, and desire to secure by Letters Patent of the United States, is—

1. In a power-loom for weaving chenille-pile carpets, the combination with mechanism for stopping the loom with the heald-staves and the reed open, of independent mechanism for laying a pick of chenille in the shed and actuating setting-jaws to set the chenille in its correct position prior to restarting the mechanism for weaving the ground fabric, all substantially as herein set forth.

2. In combination, a chenille-pile carrier, a chenille-can supported by the carrier, means for traveling and guiding the carrier from side to side of the loom and mechanism consisting of levers and of cams secured upon separate shafts for raising and drawing down and tappets on an independent shaft for closing, turning and opening a pair of jaws for setting each chenille-weft in the shed, all substantially as herein set forth.

In testimony whereof we have signed our names to this specification in the presence of two subscribing witnesses.

THOMAS FOX NAYLOR.
OSCAR STANDRING HALL.

Witnesses:
HENRY BERNOULLI BARLOW,
HERBERT ROWLAND ABBEY.